Patented Feb. 27, 1940

2,191,855

UNITED STATES PATENT OFFICE 2,191,855

N-DIHYDRO-AZINE COMPOUNDS OF THE ANTHRAQUINONE SERIES AND A PROCESS OF PREPARING THEM

Georg Kränzlein, Ernst Diefenbach, and Fritz Eggert, Frankfort-on-the-Main-Hochst, Germany, assignors to General Aniline & Film Corporation, a corporation of Delaware No Drawing. Application November 3, 1936, Serial No. 109,024. In Germany November 6, 1935

8 Claims. (Cl. 260—262)

This invention relates to N-dihydro-azine compounds of the anthraquinone series and a process of preparing them.

We have found that N-dihydro-azine compounds of the anthraquinone series may be obtained in a very simple and smooth reaction by treating substances of the following general formulae

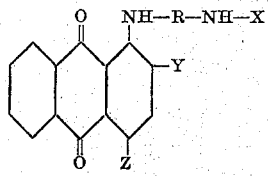

and

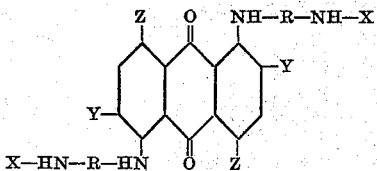

wherein R represents an aryl group of the benzene series bound to the two NH-groups of the formula in ortho positions, X represents a member of the group consisting of aryl of the benzene series, alkyl, hydroxyl alkyl, cyclo-alkyl and acyl, Y represents a member of the group consisting of sulfonic acid group and sulfonic amide group and Z represents a member of the group consisting of hydrogen and bromine, with an aqueous or alcoholic solution of an inorganic acid or alkaline agent, for instance by stirring them together at room temperature or heating them if necessary to boiling. As such solution of acid or alkaline agents there may be used for instance: caustic soda solution, caustic potash solution, sodium carbonate solution, potassium carbonate solution, hydrochloric acid, sulfuric acid, phosphoric acid and the like. The solutions may be aqueous or alcoholic. The parent materials of the above formulae may be obtained by condensing an ortho-halogen-anthraquinone - sulfonic acid or a derivative thereof which may contain further substituents in the anthraquinone radical with an amine of the following general formula:

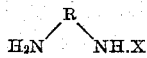

In this formula R means an aromatic radical, in which the NH$_2$- and NHX- groups stand in ortho-positions to each other. The aromatic radical R may contain substituents as well as aliphatic radicals or aromatic radicals of mononuclear, polynuclear or heterocyclic kind, furthermore, nuclei which are combined with other aliphatic or aromatic or heterocyclic radicals by CH$_2$-, CO-, NH- or like bridges.

The X of the formula means an aliphatic or aromatic radical, which may or may not contain substituents, for instance alkyl, aryl, aralkyl, acyl, alkylsulfone, arylsulfone.

During the treatment of these condensation products with an alkaline or acid agent, the ring closure to the corresponding N-dihydro-azines proceeds with separation of sulfurous acid, for instance according to the following scheme:

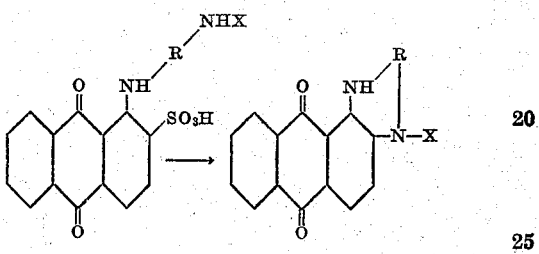

wherein R and X have the above meaning.

The invention is essentially distinguished in many respects from the hitherto known processes.

1. When preparing the intermediate products, and closing the dihydro-azine ring it is possible to work in aqueous solutions or suspensions and there is no need to isolate the intermediate products as such.

2. It is possible to form the dihydro-azine under mild conditions of reaction, so that also sensitive amine components may be used.

3. Dyestuffs of a hitherto unknown kind and many qualities may be obtained owing to the possibilities of wide choice of the anthraquinone and amine components. According to the new process a great number of new substances is obtainable, for instance, those of the following general constitutions:

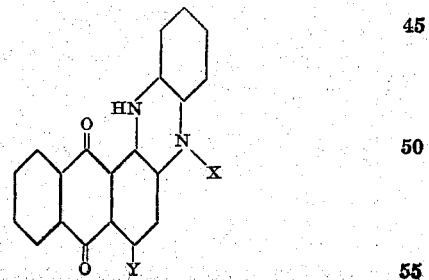

and

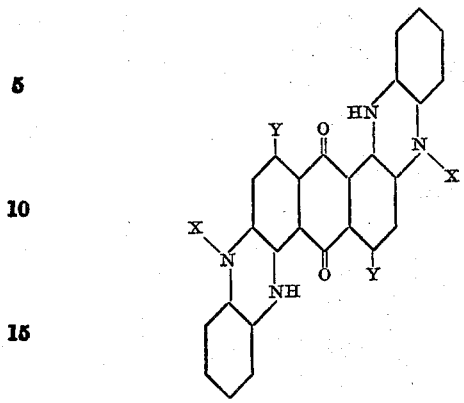

wherein X represents for instance, carboxyphenyl, chlorophenyl, dimethylaminophenyl, acetylaminophenyl, hydroxyphenyl, nitrophenyl, o-hydroxy-carboxyphenyl, nitrosulfo-phenyl, cyclohexyl and substituted alkyl groups and Y represents a member of the group consisting of hydrogen, bromine and amino radicals, and others.

4. Dyestuff-sulfonic acids serving as acid wool dyestuffs may be prepared without a special sulfonation operation.

The follwing examples serve to illustrate the invention, but they are not intended to limit it thereto; the parts are by weight:

(1) 20 parts of the compound 1:

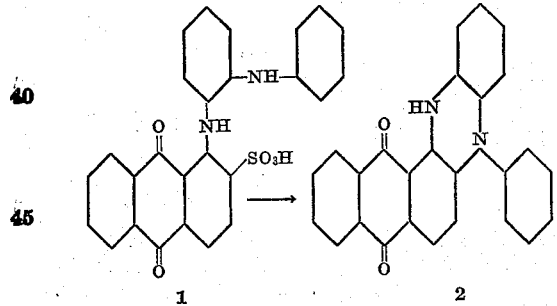

(obtainable by reaction of ortho-aminodiphenylamine with 1-bromanthraquinone-2-sulfonic acid in aqueous methyl alcohol of 25 per cent. strength in the presence of sodium bicarbonate and cuprous chloride) are dissolved in 2000 parts of water and the solution is heated to boiling after addition of 100 parts of a caustic soda solution of 35 per cent. strength. The boiling temperature is kept for 10 minutes, the whole is acidified with hydrochloric acid and filtered with suction while hot. The finely crystalline dark-blue residue is washed with hot water. The anthraquinone-1.2-dihydro-(N-phenyl)-phenazine of the Formula 2 thus obtained is a dark blue powder which dissolves in concentrated sulfuric acid to a yellow-green solution and yields a brown vat on addition of alkaline hydrosulfite. It dissolves in organic solvents to a dark blue solution; it crystallizes from acetone or glacial acetic acid in the form of fine blue needles with a bronze luster, melting at 232° C.–233° C.

(2) When condensing 1-bromanthraquinone-2-sulfonic acid with 3-amino-4-methylamino-benzene-sulfonic acid, in the manner described in Example 1, there is obtained a brown-red solution of the compound of Formula 3

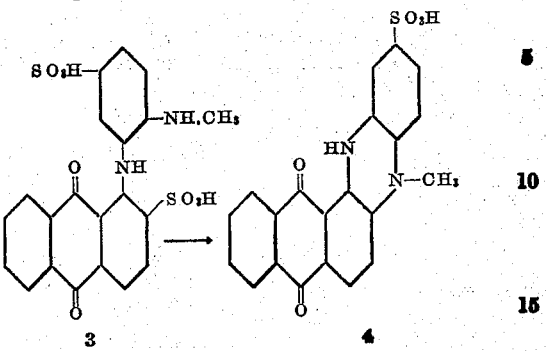

In order to close the dihydro-azine ring the clarified solution is mixed with one-fifth of its volume of caustic potash solution of 20 per cent. strength and the whole is heated for one hour at 90° C. to 95° C., whereby after a short time the solution assumes an intensely blue color. The whole is allowed to cool, the separated product is filtered with suction and washed with a dilute solution of potassium chloride. The potassium anthroquinone-1.2-dihydro-(N-methyl)-phenazine-sulfonate of the Formula 4 thus obtained is a blue powder which dissolves in concentrated sulfuric acid to a green, in water to a blue, solution. From an acid bath there are obtained on wool greenish-blue tints of very good properties of fastness. The N-ethyl compound prepared in an analogous manner has similar properties.

(3) A mixture of 25 parts of the condensation product of the Formula 5

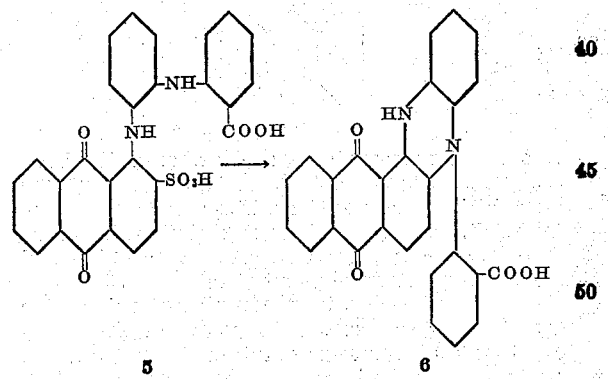

(obtainable by reaction of 1-bromanthraquinone-2-sulfonic acid with 2-amino-2-carboxy-diphenylamine) and 1000 parts of an aqueous caustic soda solution of 3 per cent. strength, is heated to gentle boiling for a short time. The deep-blue solution produced is diluted with double its weight of water and neutralized with acetic acid. On addition of hydrochloric acid the dyestuff is precipitated in the form of blue flakes. It is filtered with suction and is thus obtained in the form of a dark-blue powder which dissolves in concentrated sulfuric acid to a yellow-green solution. The dyestuff is suitable for the preparation of vat-dyestuffs.

(4) When 3-amino-4-hydroxyethylamino-benzene-sulfonic acid is condensed with 1-iodo-anthraquinone-2-sulfonic acid, in the manner described in Example 1, there is obtained a brown-red solution which is clarified and mixed with caustic soda solution, the mixture being then heated to gentle boiling until the blue tint of the solution no longer changes. The pure blue solution obtained is acidified with dilute hydrochloric acid while hot. On cooling, the dyestuff of the following constitution:

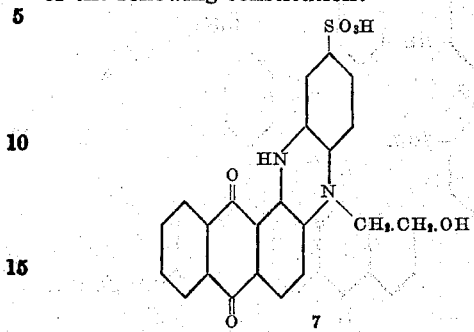

7 precipitates in the form of long, flat, blue prisms. The dyestuff dyes wool in an acid bath a greenish-blue tint of very good properties of fastness.

(5) 20 parts of the condensation product of the Formula 8 from 1-iodo-anthraquinone-2-sulfonic acid and 2-amino-diphenylamino-4-sulfonic acid

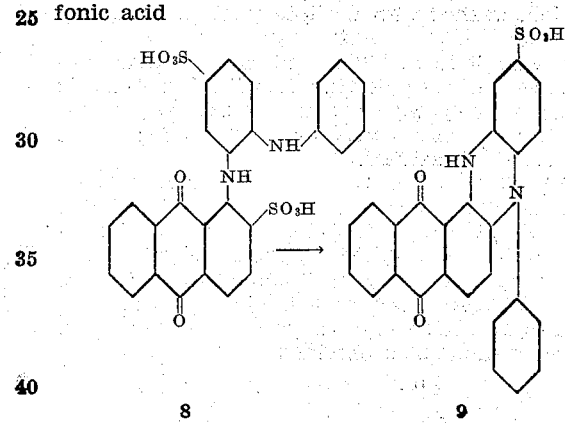

8    9 are suspended in 1000 parts of hydrochloric acid of 3 per cent. strength and the suspension is heated, while stirring, to boiling for a short while. The product is filtered with suction while warm and washed with hydrochloric acid of 3 per cent. strength. The dyestuff thus obtained is a blue powder which dyes wool in an acid bath very fast, clear, blue tints.

Instead of the hydrochloric acid of 3 per cent. strength sulfuric acid of 5% strength or phosphoric acid may be used.

(6) 20 parts of the condensation product of the Formula 10:

10    11 which is prepared by reaction of 2-amino-diphenylamine-4-sulfonic acid with 1-bromanthraquinone-2-sulfo-methyltauride are heated, while stirring, to boiling in 500 parts of an aqueous solution of hydrochloric acid of 10 per cent. strength until the separation of the dyestuff precipitated in the form of blue flakes is terminated. The whole is then neutralized with a solution of sodium carbonate of 10 per cent. strength and filtered with suction; the product is purified by dissolving it in water and precipitating it with hydrochloric acid.

(7) By condensation of 1-bromanthraquinone-2-sulfonic acid with 2-amino-4'-chlorodiphenylamine-4-sulfonic acid there is obtained a violet-brown solution from which the condensation product of Formula 12 can be isolated only with difficulty on account of its ready solubility.

When this solution is mixed with one-tenth of its volume of caustic soda solution of 40° Bé. and the whole is heated at 40° C. for one hour, the dihydro-azine dyestuff of the Formula 13:

12    13 separates in the form of thin blue needles. The dyestuff dyes wool greenish-blue tints which are distinguished by very good properties of fastness.

(8) In the same manner the dyestuff of the Formula 15:

14    15 is obtained by condensing 2-amino-4'-dimethylaminodiphenylamine-4-sulfonic acid with 1-halogenanthraquinone-2-sulfonic acid and heating to boiling the solution of the primary condensation product of Formula 14 with dilute caustic soda solution for about one hour. From a blue solution the dyestuff begins to separate during the boiling in the form of small blue needles. After cooling, the whole is filtered with suction, re-washed with cold water and finally boiled out with dilute hydrochloric acid. The dyestuff dyes wool greenish-blue tints of very good properties of fastness.

(9) By condensation of 2-amino-4-sulfodiphenyl-amine-4'-carboxylic acid with 1-halogenanthraquinone-2-sulfonic acid in the manner described in Example 1 there is obtained a brown-red solution of the condensation product of Formula 16:

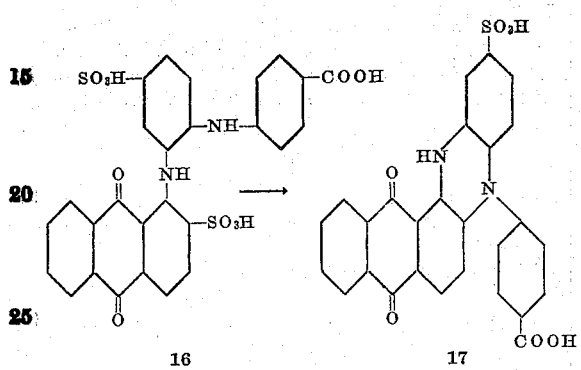

16        17

When this solution is mixed with dilute caustic soda solution, the red-brown color changes to blue after about half-an-hour. The whole is stirred for about 12 hours at 25° C. to 30° C., then mixed with hydrochloric acid and filtered with suction. By redissolving in the usual manner there is obtained the dihydro-azine dyestuff of the Formula 17 in the form of a dark-blue powder. It dyes wool from an acid bath fast blue tints. If the amino-diphenylamine derivative without a sulfogroup is used there is obtained a blue dyestuff which is suitable for the preparation of vat-dyestuffs.

(10) By condensation of 1-iodo-anthraquinone-2-sulfonic acid with 2-amino-4-sulfodiphenyl-amino-2'-carboxylic acid in the manner described in Example 1 there is obtained a brown-red solution of the intermediate product of the Formula 18:

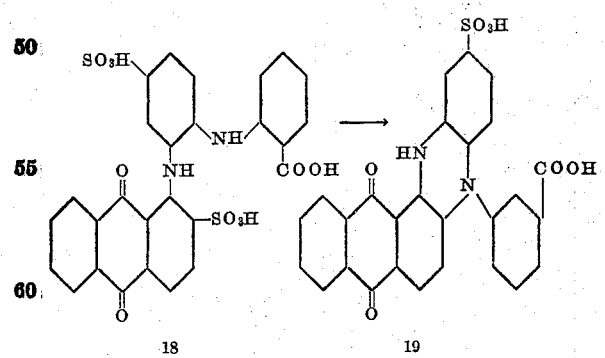

18        19

In order to transform the intermediate product into the dihydro-azine derivative of the Formula 19 the solution is mixed with one-fifth of its volume of caustic soda solution of 40° Bé. and the temperature is kept at 40° C. to 60° C. for 22 hours. The dyestuff is worked up as indicated in the preceding example. It dyes wool from an acid bath blue tints of very good properties of fastness.

(11) 1-bromanthraquinone-2-sulfonic acid is condensed with 2-amino-4'-acetylaminodiphenyl-amine-4-sulfonic acid in the manner described in Example 1, whereby a violet-brown solution of the dyestuff of the Formula 20 is obtained:

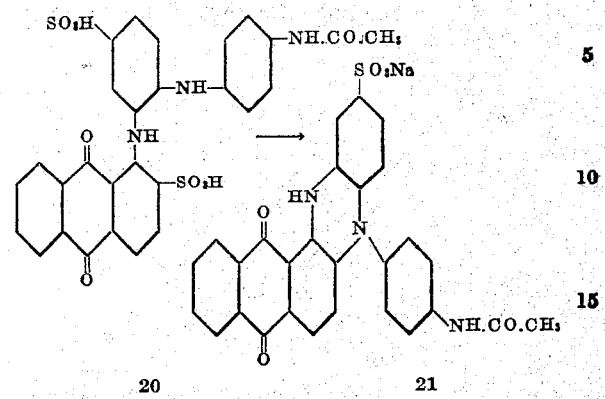

20        21

This solution is clarified, mixed with dilute caustic soda solution and stirred at ordinary temperature for 48 hours, whereby the dihydroazine of the Formula 21 gradually separates in the form of small blue crystals. The whole is filtered with suction, washed with a dilute solution of sodium chloride, and the dyestuff is finally purified by dissolving it in a dilute solution of sodium carbonate and precipitating it with hydrochloric acid. A blue powder is obtained which dyes wool from an acid bath greenish-blue tints of excellent properties of fastness.

(12) If 25 parts of 1-iodo-4-bromanthraquinone-2-sulfonic acid are mixed at room temperature with 17 parts of 2-amino-4-sulfodiphenyl-amine-4'-hydroxy-3'-carboxylic acid in the presence of 12 parts of calcined sodium carbonate and 0.5 part of cuprous chloride in 150 parts of water, a red-brown solution of the condensation product of the Formula 22 is obtained

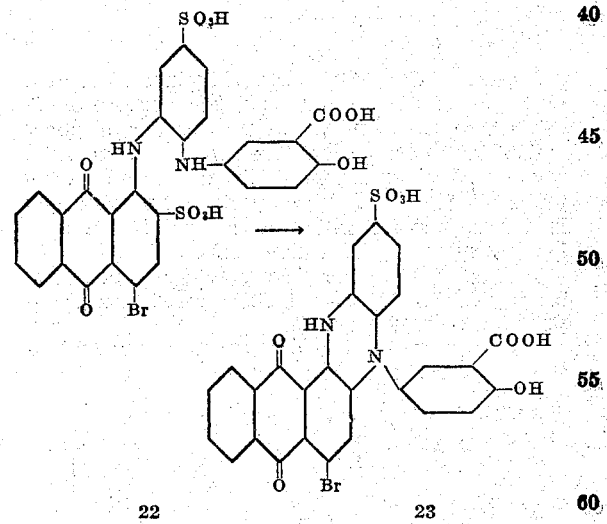

22        23

By gradually mixing this solution, while stirring, at room temperature with a caustic soda solution of 35 per cent. strength, the color is changed to a pure blue after a short while. Stirring is then continued until the color of the solution no longer changes; the dyestuff of the Formula 23 which is formed, is separated by addition of about 1000 parts of a solution of sodium chloride of 30 per cent. strength. After filtration, the product is washed with a solution of sodium chloride of 10 per cent. strength. For further purification, the product is dissolved in water and precipitated by addition of dilute hydrochloric acid.

The dyestuff thus obtained dyes wool from an acid bath greenish-blue tints. By after-chroming, the shade of the acid dyeing is displaced to the greenish side. The dyeings are distinguished by excellent properties of fastness.

By heating the dyestuff of Formula 23 with 10 times its weight of an aqueous ammonia solution of 20 per cent. strength in a pressure vessel to 110° C. for 6 hours, the bromine atom is exchanged by the NH₂-group. The dyestuff thus obtained differs from the parent material by a much more greenish shade. The bromine may also be exchanged in known manner by amino radicals whereby a number of further new dyestuffs is obtainable.

(13) 2 - amino - 4 - sulfodiphenylamine-4'-hydroxy-3'-carboxylic acid is condensed with 1-bromanthraquinone-2-sulfonic acid in the manner described in Example 1, whereby a brown-violet solution of the compound of the Formula 24 is obtained:

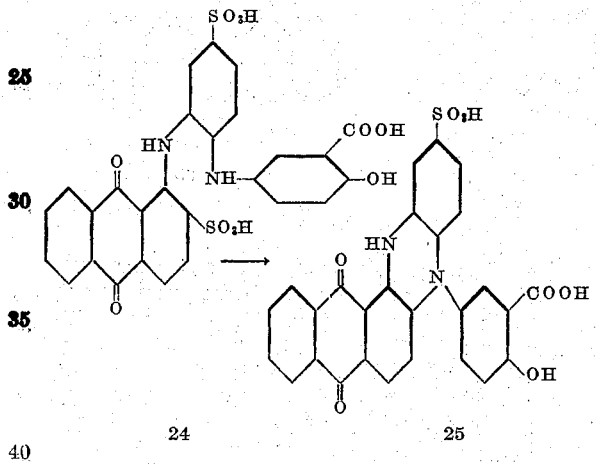

24     25

After filtration, this solution is mixed with one-quarter of its volume of caustic soda solution of 40° Bé. and stirred. After a short while, the color of the solution has changed to blue. Thereupon, the whole is heated to 80° C. and mixed with sodium chloride, whereupon the dyestuff of the Formula 25 is obtained in the form of a blue precipitate. The dyestuff dyes wool in an acid bath greenish-blue tints the fastness of which may be further improved by after-chroming.

(14) When 2-amino-4-sulfodiphenylamino-5'-sulfo-2'hydroxy-3'-carboxylic acid is condensed with 1-halogen-anthraquinone-2-sulfonic acid in the manner described in Example 1, the compound of the Formula 26 is obtained:

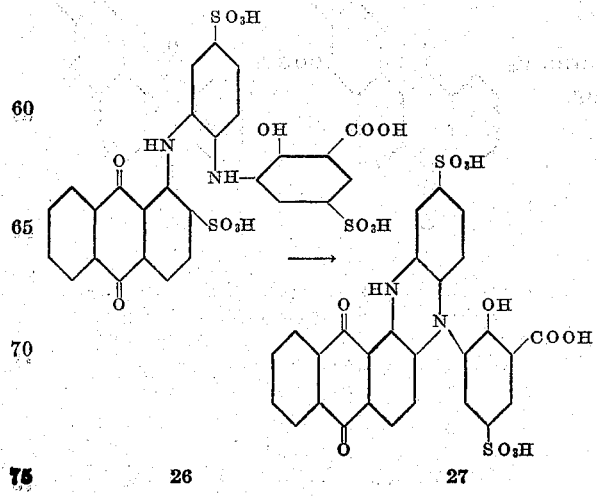

26     27

By mixing the aqueous solution of this compound with one-tenth of its volume of caustic soda solution of 40° Bé. and stirring the whole at room temperature for some hours, the color of the solution becomes deep-violet. When the color no longer changes, dilute hydrochloric acid is added to the filtered solution until the product has completely separated in the form of violet flakes. The dyestuff thus obtained of Formula 27 is a dark-violet powder which dissolves in concentrated sulfuric acid to a blue-green solution. The acid as well as the after-chromed dyeing on wool is violet.

(15) When 2 - amino - 2'-nitrodiphenylamine-4'-sulfonic acid is condensed with 1-iodo-anthraquinone-2-sulfonic acid, in the manner described in Example 1, the compound of the Formula 28 is obtained:

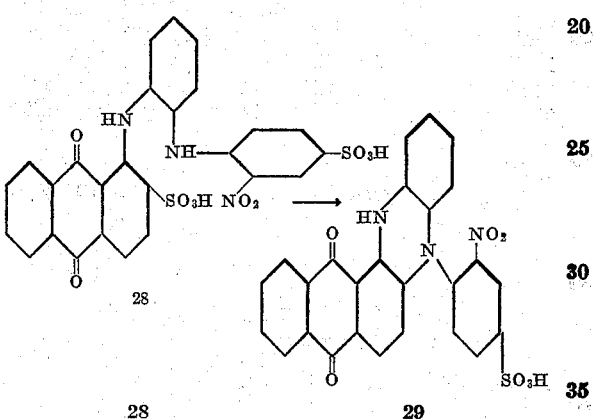

28     29

Its aqueous solution is mixed with one-tenth of its volume of caustic soda solution of 35 per cent. strength and kept at gentle boiling for about three hours. The dyestuff of the Formula 29 obtained in the form of small blue needles is filtered with suction, washed with a solution of sodium chloride of 2 per cent. strength and dried. It dyes wool blue tints of very good fastness properties. By reduction of the nitro-group by means of sodium sulfide a product is obtained which yields on wool greenish-blue tints of likewise very good properties of fastness.

(16) A mixture of 27 parts of potassium 1-iodo-anthraquinone-2-sulfonate, 18 parts of 2-methylamino-3-amino-5-sulfobenzoic acid, 18 parts of calcined sodium carbonate and 1 part of cuprous chloride is stirred in 300 parts of water at room temperature for 18 hours. The mixture gradually becomes blue. By working up the batch, the dihydro-azine of the Formula 31 is obtained, as the primary reaction product of the Formula 30 has already split off sulfurous acid by the action of the sodium carbonate.

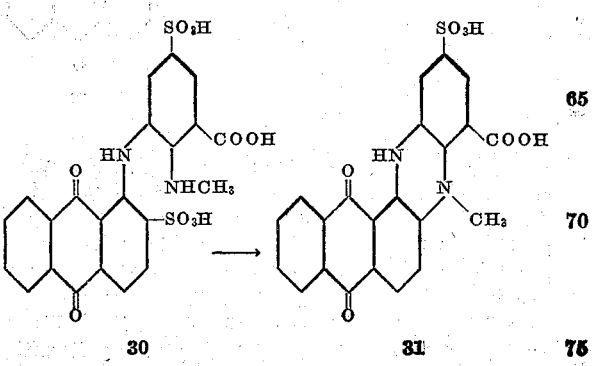

30     31

The dyestuff is isolated by introducing the clarified blue solution, while stirring, into thrice its volume of a solution of sodium chloride of 10 per cent. strength, acidifying with dilute hydrochloric acid, heating to boiling for a short while and filtering the separated compound with suction. It is obtained in the form of a dark-blue powder which dissolves in concentrated sulfuric acid to a green solution.

(17) 15 parts of the compound of the Formula 32 obtainable from 1-iodoanthraquinone-2-sulfonic acid and 1-cyclohexylamino-2-aminobenzene-4-sulfonic acid are dissolved in 1500 parts of water and the solution is heated to boiling with 150 parts of a caustic soda solution of 35 per cent. strength until the dihydro-azine dyestuff of the Formula 33 has completely separated. The small blue needles obtained are filtered with suction while hot and washed with water. The product in the form of its alkali salts dissolves in water to a reddish-blue solution. The color of the solution in concentrated sulfuric acid is green-yellow.

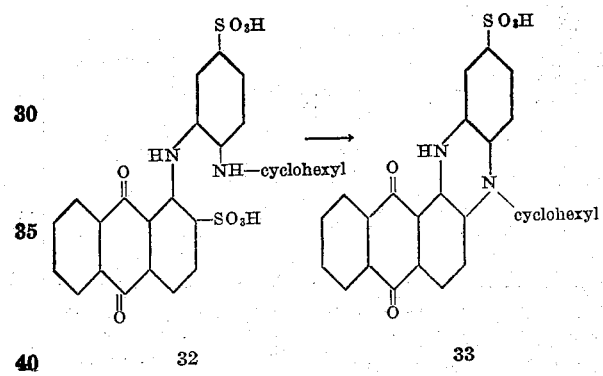

32    33

(18) 20 parts of the compound of the Formula 34, obtainable by condensation of 3-amino-4-phenyl-aminobenzophenone-2'-carboxylic acid with 1-brom-anthraquinone-2-sulfonic acid in the manner described in Example 1 are dissolved in 2000 parts of a caustic soda solution of 1 per cent. strength and the solution is heated, while stirring, at 90° C. to 95° C. for some time. The solution quickly becomes intensely blue with gradual separation of dark-blue flakes. When no more flakes separate, the whole is filtered with suction, the solid matter is washed with a dilute solution of sodium chloride; it constitutes the dyestuff and is purified by dissolving it in dilute caustic soda solution and precipitating it with hydrochloric acid. The product thus obtained has the Formula 35. It dissolves in concentrated sulfuric acid to an olive-green solution. The solution in dilute alkali is intense blue. On addition of alkali-hydrosulfite, a brown-red vat is obtained.

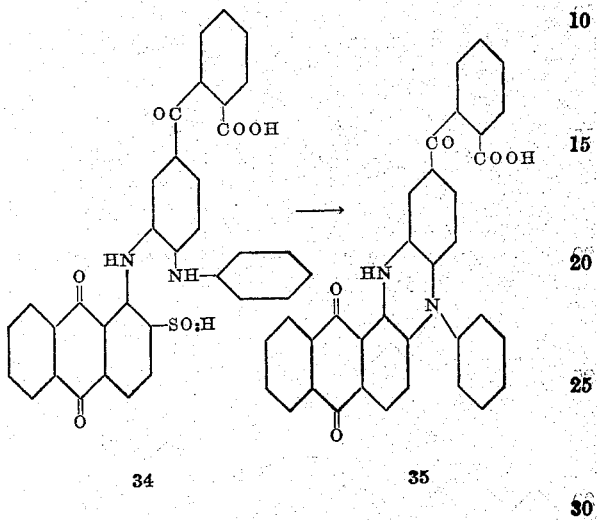

34    35

(19) 10 parts of the compound of the Formula 36, obtainable from 1-iodoanthraquinone-2-sulfonic acid and monoacetyl-ortho-phenylene-diamine, are introduced into 300 parts of a methyl alcoholic caustic potash solution of 20 per cent. strength and heated, while stirring, at 70° C.– 75° C. for one hour. There is first formed a blue solution from which a blue-green substance gradually separates. The mixture is poured into water, feebly acidified with dilute hydrochloric acid, filtered with suction and washed with water. The substance obtained behaves completely in accordance with the anthraquinone-1.2-dihydroazine of the Formula 38 described by Ullmann and Foder (cf. "Annalen" vol. 380, page 324) so that its mode of formation in the present example may be formulated as follows:

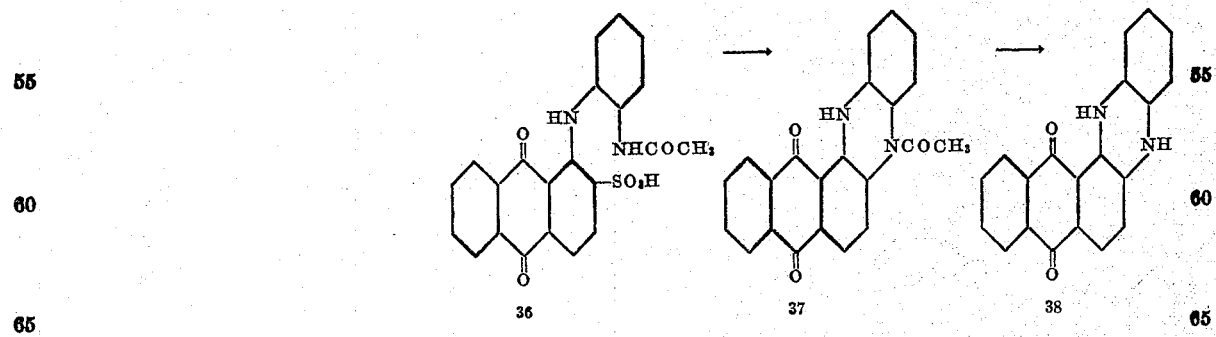

36    37    38

(20) By condensing 1 mol. of sodium 1.5-di-iodo-anthraquinone-2.6-disulfonate with 2 mols. of 2-amino-diphenyl-amine-4-sulfonic acid, a condensation product is obtained which corresponds with the Formula 39. By mixing the product with dilute caustic soda solution it may be transformed into a dyestuff which probably has the constitution of the Formula 40. It dissolves in water to a green-blue solution. The solution in concentrated sulfuric acid is yellow-green.

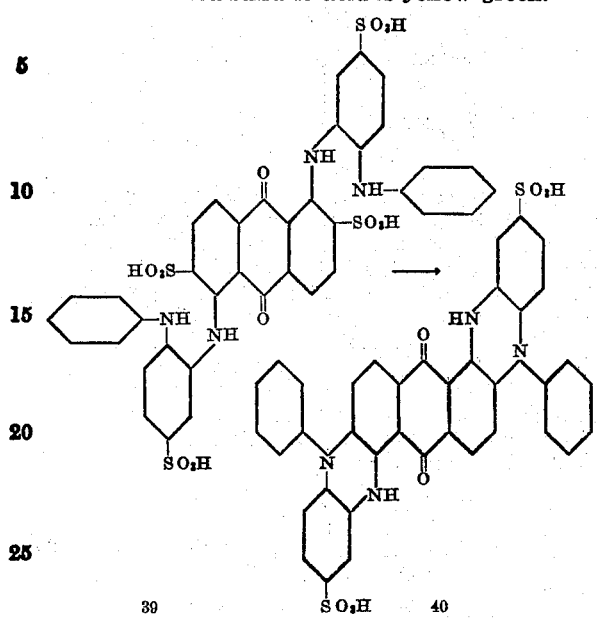

The product yields on wool greenish-gray tints of very good properties of fastness.

(21) In a manner similar to that described in Example 20 there is obtained, by condensation of sodium 1.5-di-iodo-anthraquinone-2.6-disulfonate with 2 mols. of 2-amino-4-sulfo-4'-hydroxy-diphenyl-amine-3'-carboxylic acid, a compound of the Formula 41, which, when heated with dilute caustic soda solution may be transformed into a dyestuff which probably corresponds with the Formula 42:

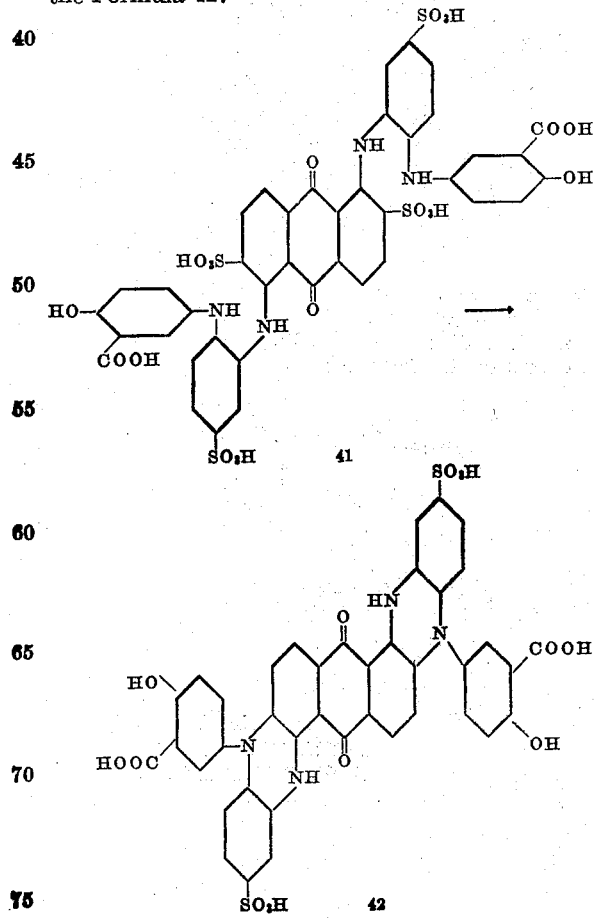

The product dissolves in water to a blue solution and in concentrated sulfuric acid to a yellow-green solution. With alkaline hydrosulfite solution an olive-green vat is obtained which, on further addition of hydrosulfite, turns to a brown-violet vat. From an acid solution there are obtained on wool greenish-blue dyeings which are capable of being after-chromed.

(22) In a similar manner there is obtained from the condensation product of sodium 1.5-dibromanthraquinone - 2.6 - disulfonate with 2 mols. of 2-amino-4-sulfo-4'-acetaminodiphenylamine a compound which has probably the constitution of the Formula 43:

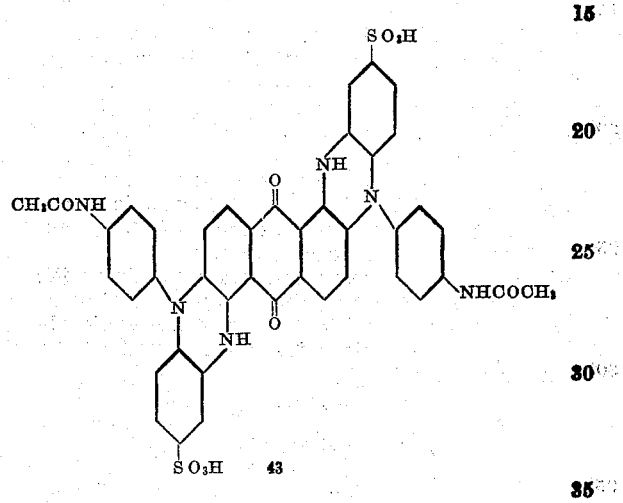

It dissolves in water to a blue solution, in concentrated sulfuric acid to a yellow-green solution and dyes wool fast blue tints.

Instead of the acetyl compound there may also be used any other aryl compound, for instance the benzoyl compound. A product with similar properties is obtained.

We claim:

1. The process which comprises treating with a condensing agent of the group consisting of aqueous and alcoholic solutions of inorganic alkalies and inorganic acids a member of the group consisting of compounds of the general formulae:

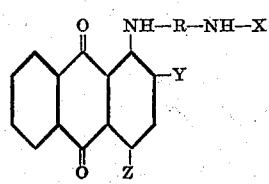

and

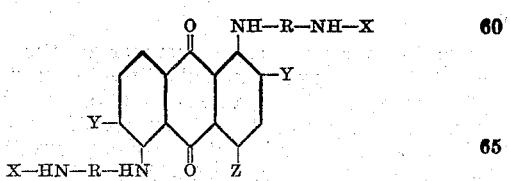

wherein R represents a member of the group consisting of phenyl and substituted phenyl radicals bound to the two NH—groups of the formula in ortho positions, X represents a member of the group consisting of phenyl and substituted phenyl radical, alkyl, hydroxy-alkyl, cycloalkyl and acyl, Y represents a member of the group consisting of sulfonic acid group and sulfonic amide group and Z represents a member of the group consisting of hydrogen and bromine.

2. The process which comprises treating with a condensing agent of the group consisting of aqueous and alcoholic solutions of inorganic alkalies and inorganic acids a compound of the general formula:

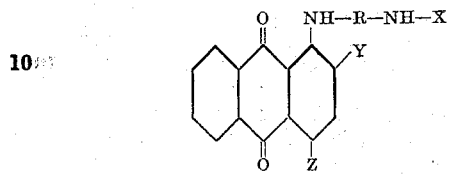

wherein R represents a member of the group consisting of phenyl and substituted phenyl radicals bound to the two NH— groups of the formula in ortho positions, X represents a member of the group consisting of phenyl and substituted phenyl radicals, alkyl, hydroxy-alkyl, cycloalkyl and acyl, Y represents a member of the group consisting of sulfonic acid group and sulfonic amide group and Z represents a member of the group consisting of hydrogen and bromine.

3. The process which comprises treating with a condensing agent of the group consisting of aqueous and alcoholic solutions of inorganic alkalies and inorganic acids a compound of the general formula

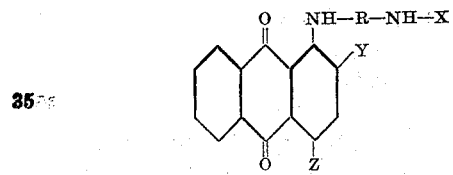

wherein R represents a member of the group consisting of phenyl and substituted phenyl radicals bound to the two NH— groups of the formula in ortho positions, X represents a member of the group consisting of phenyl and substituted phenyl radicals, alkyl, hydroxy-alkyl, cycloalkyl and acyl, Y represents a sulfonic acid group and Z represents a member of the group consisting of hydrogen and bromine.

4. The process which comprises treating with an aqueous solution of a condensing inorganic alkali, a compound of the general formula:

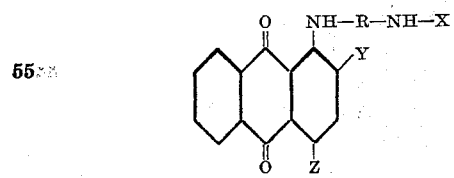

wherein R represents a member of the group consisting of phenyl and substituted phenyl radicals bound to the two NH— groups of the formula in ortho position, X represents a member of the group consisting of phenyl and substituted phenyl radicals, alkyl, hydroxy-alkyl, cycloalkyl and acyl, Y represents a sulfonic acid group and Z represents a member of the group consisting of hydrogen and bromine.

5. The process which comprises treating with an aqueous solution of a condensing inorganic alkali, a compound of the general formula:

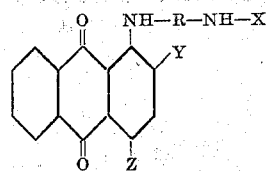

wherein R represents a member of the group consisting of phenyl and substituted phenyl radicals bound to the two NH— groups of the formula in ortho positions, X represents a member of the group consisting of phenyl and substituted phenyl radicals, Y represents a sulfonic acid group and Z represents a member of the group consisting of hydrogen and bromine.

6. The process which comprises stirring for 48 hours at room temperature a mixture of dilute caustic soda solution with a solution of the compound of the formula:

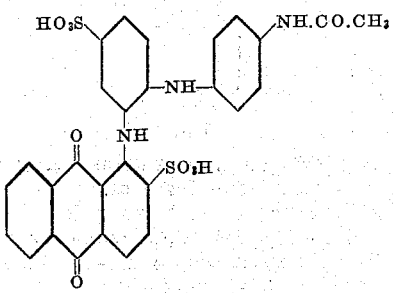

7. The process which comprises feebly boiling for about 3 hours a mixture of caustic soda solution with a solution of the compound of the formula:

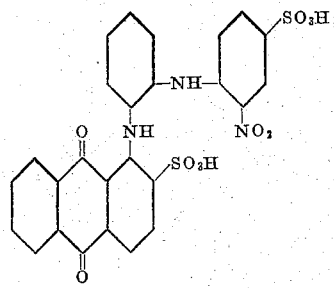

8. The process which comprises boiling until completion of the dyestuff separation a mixture of caustic soda solution with a solution of the compound of the formula:

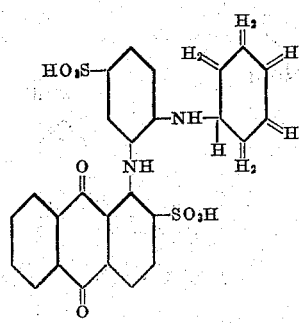

GEORG KRÄNZLEIN.
ERNST DIEFENBACH.
FRITZ EGGERT.